United States Patent
Katagiyama et al.

(10) Patent No.: US 8,459,878 B2
(45) Date of Patent: Jun. 11, 2013

(54) OPTICAL CONNECTOR AND OPTICAL CONNECTOR CABLE

(75) Inventors: Naoki Katagiyama, Tokyo (JP); Hideto Shimazu, Tokyo (JP); Yuichi Koreeda, Tokyo (JP); Takeo Toda, Tokyo (JP); Hideo Sugimoto, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 276 days.

(21) Appl. No.: 12/807,760

(22) Filed: Sep. 14, 2010

(65) Prior Publication Data

US 2011/0075974 A1  Mar. 31, 2011

(30) Foreign Application Priority Data

Sep. 30, 2009  (JP) .................................. 2009-228368

(51) Int. Cl.
*G02B 6/36* (2006.01)
*G02B 6/38* (2006.01)

(52) U.S. Cl.
USPC .................................. 385/72; 385/78; 385/87

(58) Field of Classification Search
USPC ................................ 385/72, 78, 87
See application file for complete search history.

(56) References Cited

U.S. PATENT DOCUMENTS 7,503,707 B2 * 3/2009 Ray et al. ......................... 385/97
2008/0138016 A1 * 6/2008 Katagiyama et al. ........... 385/62

FOREIGN PATENT DOCUMENTS

JP  62-209403  9/1987
JP  2002-328261  11/2002

* cited by examiner

*Primary Examiner* — Omar Rojas
(74) *Attorney, Agent, or Firm* — Collard & Roe, P.C.

(57) ABSTRACT

An optical connector is selectively attachable to one of optical fiber cables including a first type optical fiber cable and a second type optical fiber cable. Each of the optical fiber cables includes a common optical fiber and a common ferrule fixed to the common optical fiber. The first type optical fiber cable further includes a tension member. The second type optical fiber cable further including a tensile member. The optical connector has a swage portion through which the common ferrule is inserted forward when one of the optical fiber cables is attached to the optical connector. The swage portion has an outer surface on which the tensile member is swaged when the second type optical fiber cable is attached to the optical connector. The optical connector also has a fixing portion having at least one receiver hole formed therein for receiving and fixing an end of the tension member of the first type optical fiber cable. The fixing portion is located forward of the swage portion.

12 Claims, 9 Drawing Sheets

OPTICAL CONNECTOR AND OPTICAL CONNECTOR CABLE

CROSS REFERENCE TO RELATED APPLICATIONS

Applicants claim priority under 35 U.S.C. §119 of Japanese Patent Application No. JP2009-228368 filed Sep. 30, 2009.

BACKGROUND OF THE INVENTION

The present invention relates to an optical connector cable having an optical fiber cable and an optical connector attached to the optical fiber cable.

Optical fiber cables are roughly classified into a type of optical fiber having a tensile member and a type of optical fiber having a tension member. With regard to optical connectors attached to optical fiber cables, different structures should be prepared so as to correspond to different types of optical fiber cables. See, e.g., JP-A 2002-328261 and JP-A 62-209403. An optical connector disclosed in JP-A 2002-328261 has a portion to which a tensile member is swaged and fixed. An optical connector disclosed in JP-A 62-209403 has a portion to which an end of a tension member is fixed.

As described above, conventional optical connectors have different structures for different types of optical fiber cables and are not versatile. Therefore, there is a limit to unit price reduction. Furthermore, if a type of optical fiber cables to be used is determined in the field, multiple types of optical connectors need to be prepared although some of them are not actually used.

SUMMARY OF THE INVENTION

It is, therefore, an object of the present invention to provide an optical connector having a structure that can be used in common to multiple types of optical fiber cables.

One aspect of the present invention provides an optical connector selectively attachable to one of optical fiber cables including a first type optical fiber cable and a second type optical fiber cable. Each of the optical fiber cables includes a common optical fiber and a common ferrule fixed to the common optical fiber. The first type optical fiber cable further includes a tension member. The second type optical fiber cable further includes a tensile member. The optical connector has a swage portion through which the common ferrule is inserted forward when one of the optical fiber cables is attached to the optical connector. The swage portion has an outer surface on which the tensile member is swaged when the second type optical fiber cable is attached to the optical connector. The optical connector also has a fixing portion having at least one receiver hole which receives and fixes an end of the tension member when the first type optical fiber cable is attached to the optical connector. The fixing portion is located forward of the swage portion.

Another aspect of the present invention provides an optical connector cable having one of optical fiber cables including a first type optical fiber cable and a second type optical fiber cable. Each of the optical fiber cables includes a common optical fiber and a common ferrule fixed to the common optical fiber. The first type optical fiber cable further includes a tension member. The second type optical fiber cable further includes a tensile member. The optical connector cable also has an optical connector attached to the one of the optical fiber cables. The optical connector includes a swage portion through which the common ferrule is inserted forward when one of the optical fiber cables is attached to the optical connector. The swage portion has an outer surface on which the tensile member is swaged when the second type optical fiber cable is attached to the optical connector. The optical connector also includes a fixing portion having at least one receiver hole formed therein for receiving and fixing an end of the tension member of the first type optical fiber cable. The fixing portion is located forward of the swage portion.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

An optical connector and an optical connector cable having an optical fiber cable according to embodiments of the present invention will be described with reference to FIGS. 1 to 18.

Figure 1:
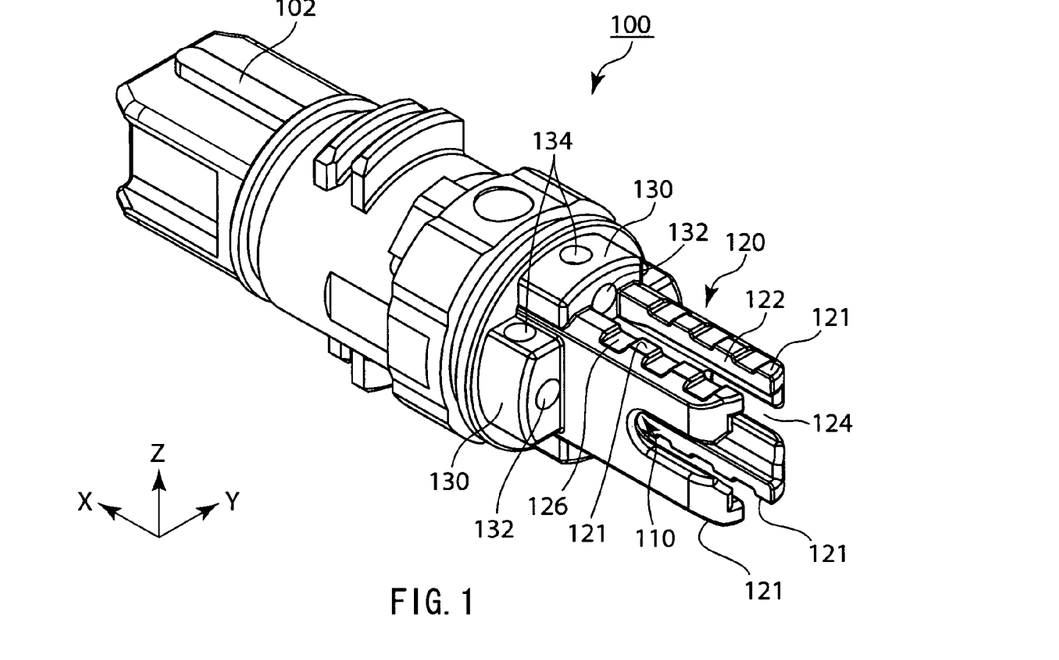
FIG. 1 is a perspective view showing an optical connector according to a first embodiment of the present invention.
Figure 2:
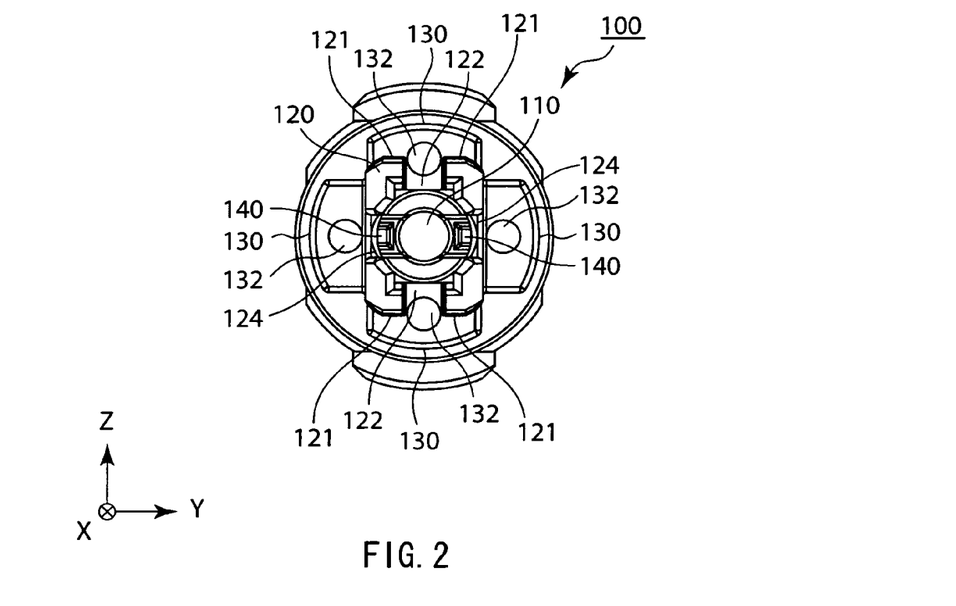
FIG. 2 is a rear view showing the optical connector of FIG. 1.
Figure 4:
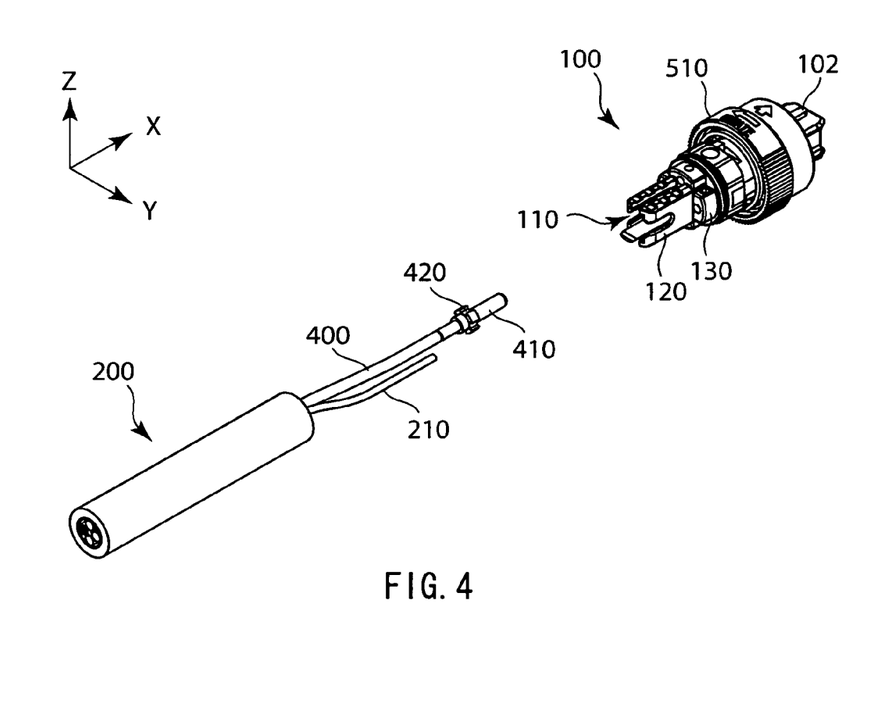
FIG. 4 is a perspective view showing a step of attaching a first type optical fiber cable having a tension member to the optical connector of FIG. 1.
Figure 5:
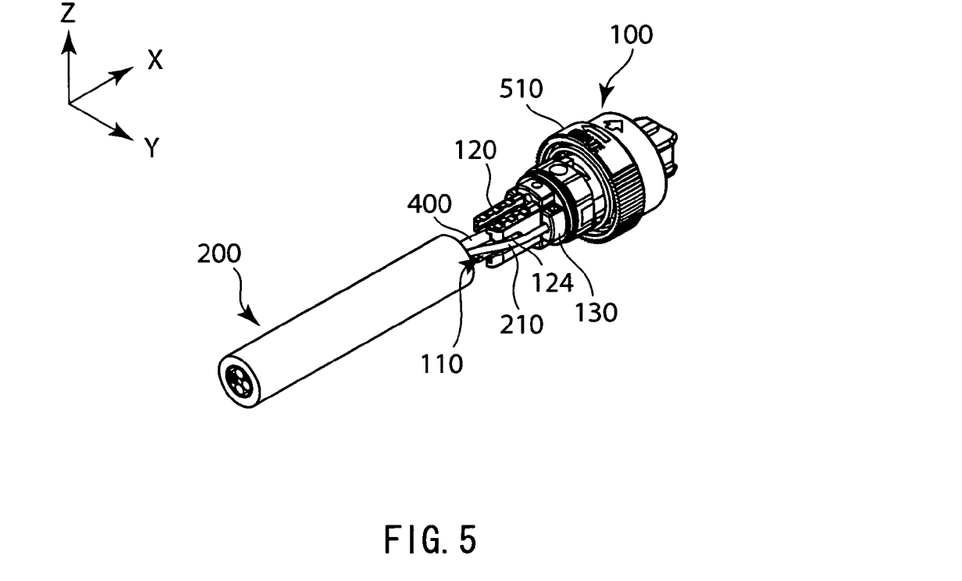
FIG. 5 is a perspective view showing an attachment step subsequent to FIG. 4. The tension member is fixed to a rightward fixing portion of the optical connector.
Figure 11:
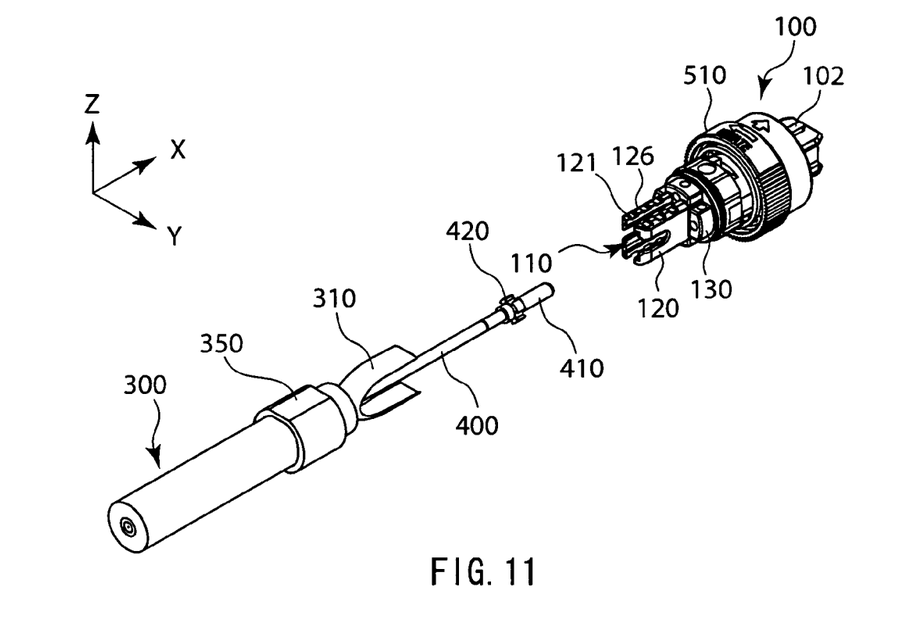
FIG. 11 is a perspective view showing a step of attaching a second type optical fiber cable having a tensile member to the optical connector of FIG. 1.

An optical connector 100 according to a first embodiment of the present invention has a structure as shown in FIGS. 1 and 2. This structure allows the optical connector 100 to be attached to a first type optical fiber cable 200 having a tension member 210 as shown in FIG. 4 and to be attached to a second type optical fiber cable 300 having a tensile member 310 as shown in FIG. 11.

Figure 3:
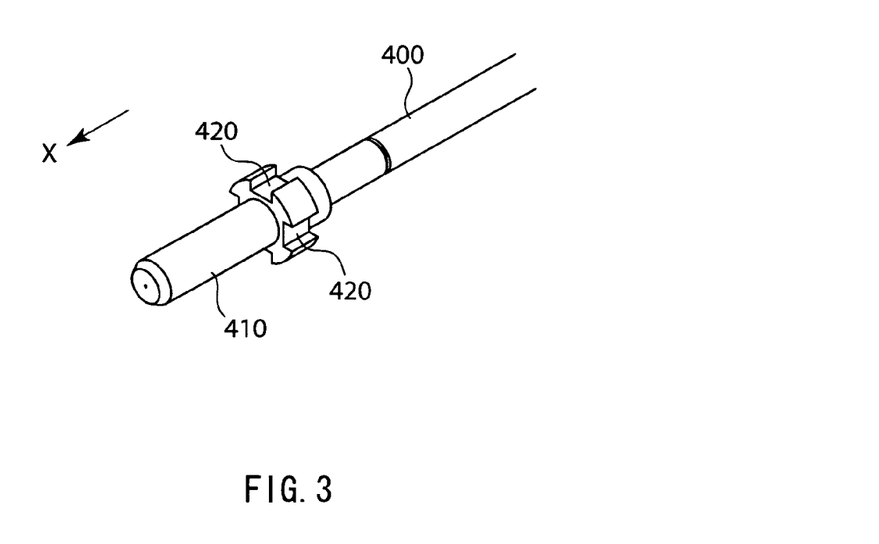
FIG. 3 is a perspective view showing a tip of an optical fiber included in an optical fiber cable attachable to which the optical connector of FIG. 1.

Each type of optical fiber cable includes a common optical fiber 400 and a common ferrule 410 attached to an end of the common optical fiber 400 as shown in FIG. 3. The optical fiber cable has four key grooves 420 formed at angular intervals of 90 degrees around the optical fiber cable near a rear end of the common ferrule 410. Generally, an optical fiber in an optical fiber cable is located eccentrically in one direction. Therefore, in order to establish good optical connection, the eccentric direction should be aligned with that of an optical connection target to be mated. For that purpose, the optical connector 100 is attached to the optical fiber cable such that the eccentric direction of the common optical fiber 400 is aligned with an upward direction of the optical connector 100. Thus, the eccentric directions are standardized. Therefore, when optical connectors 100 are connected to each other, the eccentric directions of common optical fibers 400 held by the optical connectors 100 can conform to each other. For example, the optical connector 100 shown in FIG. 1 has a connector key 102 formed on a front upper portion thereof. The connector key 102 serves to guide the optical connector 100 at the time of connection and also to indicate an upper side of the optical connector 100 when the optical connector 100 is connected to an adaptor or a mating connector. Therefore, it is possible to adjust the eccentric direction of the common optical fiber 400 to an upward direction of the optical connector 100 when the optical connector 100 is connected to the optical fiber cable. Thus, adjustment of the positional relationship with the optical fiber held by the mating connector or the like can be facilitated merely by connecting the optical connector 100 to the mating connector or the like in a state where the connector key 102 faces upward.

The key grooves 420 are used to maintain the eccentric direction that has already been determined. Specifically, if the common ferrule 410 or the common optical fiber 400 itself is rotated after the eccentric direction of the common optical fiber 400 has been adjusted to an upward direction of the optical connector 100, then the eccentric directions cannot conform to each other. Therefore, the rotation of the common optical fiber 400 is prevented by engaging, with the key grooves 420, rotation prevention keys 140 provided on the optical connector 100, which will be described later. Thus, the adjusted eccentric direction is maintained.

As shown in FIGS. 1 and 2, the optical connector 100 includes a receptacle portion 110 for receiving the common ferrule 410 attached to the common optical fiber 400, a swage portion 120 for swaging the tensile member 310 of the second type optical fiber cable 300, fixing portions 130 for fixing an end of the tension member 210 of the first type optical fiber cable 200, and rotation prevention keys 140 formed within the receptacle portion 110. The rotation prevention keys 140 are designed to be engagable with one of the plurality of key grooves 420, respectively. In the illustrated example, the number of the rotation prevention keys 140 is two, and the number of the key grooves 420 is four. The two rotation prevention keys 140 are opposed to each other in a lateral direction of the optical connector 100.

The receptacle portion 110 according to the present embodiment extends frontward from a rear end of the swage portion 120 so as to penetrate the optical connector 100. The receptacle portion 110 receives a tip of the common optical fiber 400 (i.e., the portion to which the common ferrule 410 is attached) inserted from the rear end of the swage portion 120. As can be seen from this structure, the optical axis of the common optical fiber 400 is directed to the same direction as a longitudinal direction of the optical connector 100 (the X-direction) in the present embodiment. The receptacle portion 110 extends along the direction of the optical axis of the common optical fiber 400, i.e., along the longitudinal direction of the optical connector 100. Therefore, the common ferrule 410 is inserted forward through the swage portion 120 when one of the optical fiber cables is attached to the optical connector 100.

The swage portion 120 has a roughly rectangular shape in which vertical sides extending along the vertical direction (the Z-direction) are longer than lateral sides extending along the lateral direction (the Y-direction) as viewed from the rear side of the optical connector 100. The swage portion 120 has the aforementioned shape because a swaging ring 350 (see FIG. 12) is subjected to be pressed in the vertical direction when the tensile member 310 is swaged and also because the swaging ring 350 is deformed so as to swell in the lateral direction. With the rectangular shape of the swage portion 120, even if the swaging ring 350 is deformed so as to swell in the lateral direction, the swaging ring 350 can be received properly within an enclosure 520, which will be described later.

In the present embodiment, relief grooves 122 are formed in an upper portion and a lower portion of the swage portion 120, respectively. Furthermore, relief grooves 124 are formed in a rightward portion and a leftward portion of the swage portion 120, respectively. Moreover, the swage portion 120 has irregularities 126 formed on an upper surface and a lower surface (referred collectively as an outer surface 121) thereof so as to ensure that the tensile member 310 is swaged on the swage portion 120.

As described later, the relief grooves 122 and 124 are used to minimize stress applied to the tension member 210 when the tension member 210 is fixed to the fixing portion 130. The relief grooves 122 are opposed to each other in the vertical direction. The relief grooves 124 are opposed to each other in the lateral direction. Thus, the relief grooves 122 and 124 are formed at angular intervals of 90 degrees around the axis as viewed from the rear end of the optical connector 100. In the present embodiment, the relief grooves 122 opposed to each other in the vertical direction extend over the swage portion 120 along the X-direction, whereas the relief grooves 124 opposed to each other in the lateral direction only extend to the middle of the swage portion 120. The relief grooves 124 are large enough to reduce stress applied to the tension member 210. In order to make it possible to confirm the eccentric direction of the common optical fiber 400 when the optical connector 100 is attached to an end of the optical fiber cable, the relief grooves 122 are formed longer than the relief grooves 124 so as to extend over the swage portion 120. For example, after the eccentric direction of the common optical fiber 400 is confirmed, a key groove 420 that is closest to the eccentric direction is marked. Then, while the marked key groove 420 is viewed through the relief groove 122, the common optical fiber 400 is inserted into the optical connector 100. With this operation, the eccentric direction of the common optical fiber 400 can relatively readily be adjusted to the upward direction of the optical connector 100. The relief grooves 124 may be formed to extend to the same degree as the relief grooves 122. From the viewpoint of maintaining the strength of the swage portion 120, however, it is preferable to minimize the length of the relief grooves 124 as in the present embodiment.

In the optical connector 100 of this embodiment, the fixing portions 130 are located closer to the front end of the optical connector 100 than the swage portion 120. Therefore, the workability of attachment of an optical fiber cable to the optical connector 100 is improved. Additionally, adverse influence such as stress applied to the common optical fiber 400 can be reduced even if the optical fiber cable is unintentionally bent in a state where the optical fiber cable is attached to the optical connector 100.

Each of the fixing portions 130 according to the present embodiment has a receiver hole 132 extending along the optical axis (the X-direction) of the optical fiber cable for receiving an end of the tension member 210. Each of the fixing portions 130 also has a screw hole 134 extending from an exterior of the fixing portion 130 in a direction perpendicular to the optical axis. The screw hole 134 communicate with the receiver hole 132, respectively. Therefore, the receiver hole 132 is paired with the screw hole 134. In this example, four receiver holes 132 are formed at angular intervals of 90 degrees around the axis as viewed from the rear end of the optical connector 100. Therefore, for the illustrated first type optical fiber cable 200 having one tension member 210, the tension member can be fixed without unnecessary twisting forces applied to the optical fiber. Additionally, for other types of optical fiber cables having a plurality of tension members, those tension members can be fixed without unnecessary twisting forces applied to the optical fiber. Furthermore, each of the relief grooves (122 and 124) corresponds to the receiver holes 132, respectively. A pair of the relief groove (122 and 124) and the receiver hole 132 are located on a single radius extending from the optical axis of the optical fiber cable as viewed from a rear end of the swage portion. Therefore, when the end of the tension member 210 is inserted into one of the receiver holes 132, the tension member 210 can be positioned within one of the relief grooves 122 and 124. Accordingly, even though the swage portion 120 is provided, unnecessary stress is prevented from being applied to the tension member 210. Since the tension member 210 is positioned within one of the relief grooves 122 and 124, movement of the tension member 210 is restricted by the relief groove 122 or 124. Consequently, the optical connector cable has a structure resistant to unintentional bending of the optical fiber cable.

The screw holes 134 are used to fix the end of the tension member 210 received in the receiver hole 132 by a screw. Specifically, the end of the tension member 210 can be fixed within the receiver hole 132 by threading a screw into the screw hole 134 in a state where the end of the tension member 210 is received in the receiver hole 132. In the illustrated example, each of the screw holes 134 extends along the vertical direction (the Z-direction). Therefore, the screw holes 134 extend in parallel to each other. Three screw holes 134 can be seen from an upper side and a lower side of the optical connector 100, respectively. The workability of threading a screw can be improved with the screw holes 134 thus arranged.

Figure 6:
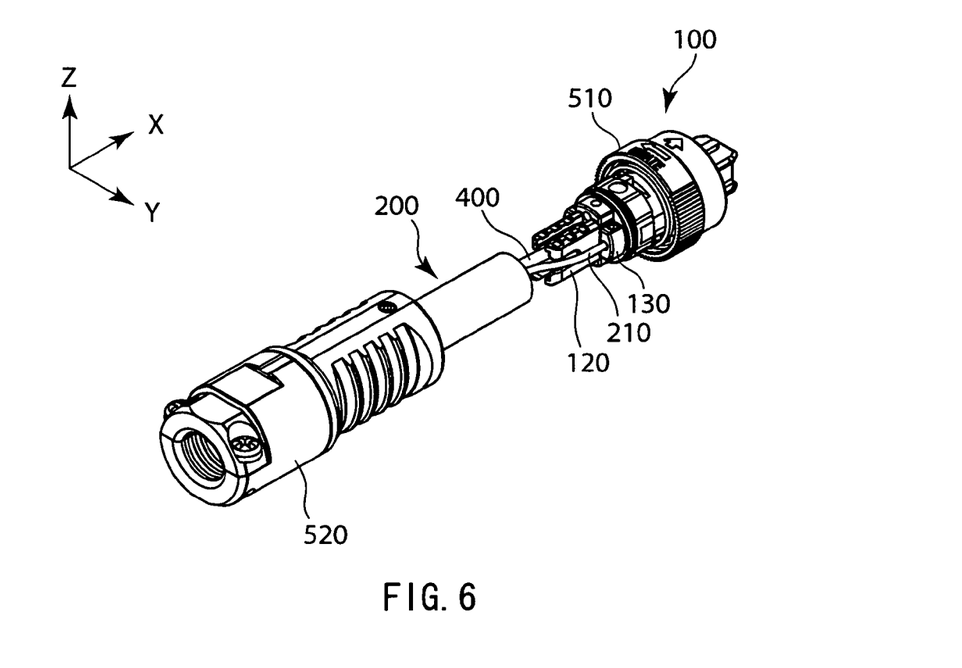
FIG. 6 is a perspective view showing an attachment step subsequent to FIG. 5.
Figure 7:
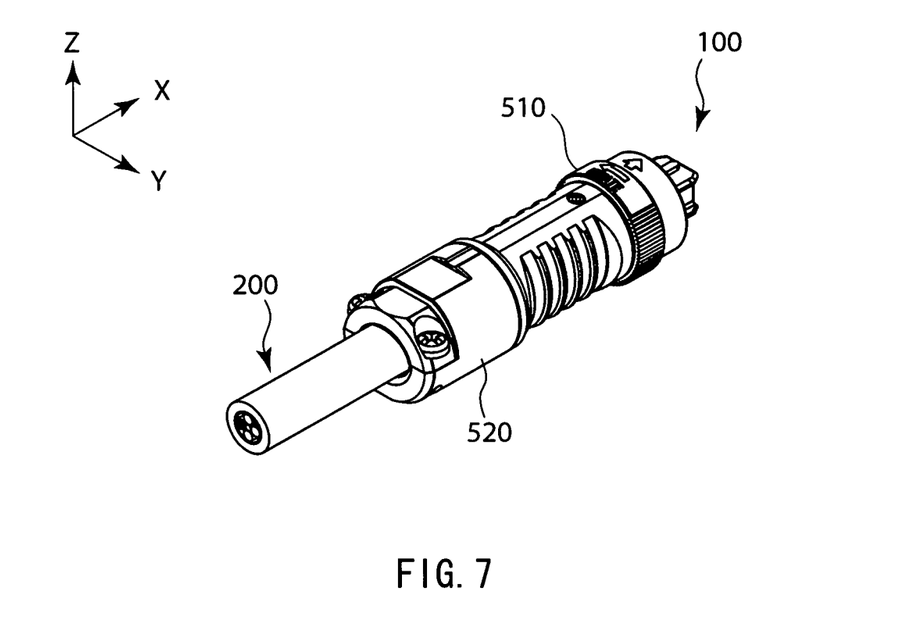
FIG. 7 is a perspective view showing an optical connector cable assembled through the attachment step of FIG. 6.
Figure 8:
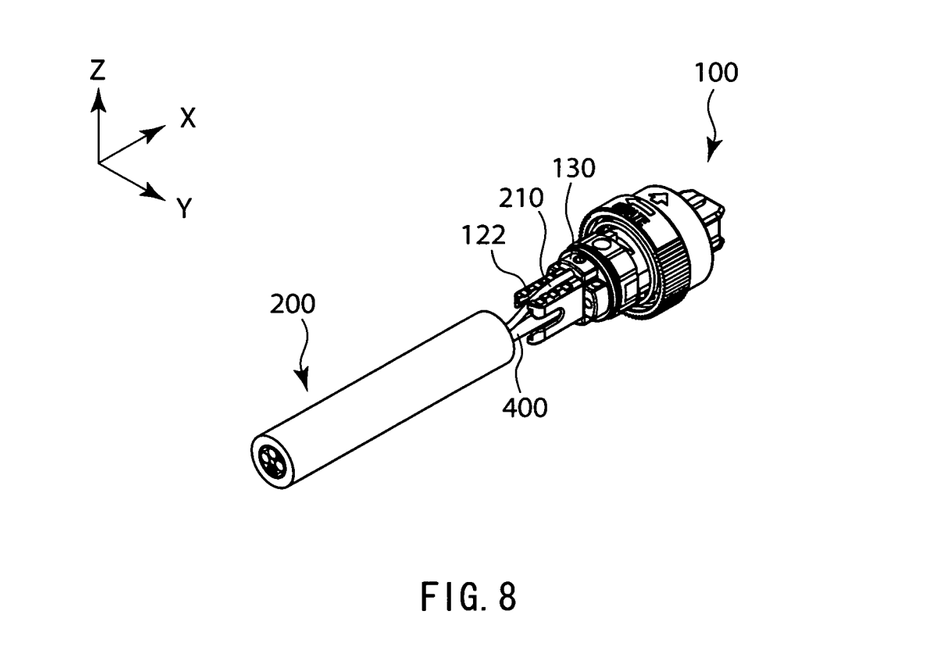
FIG. 8 is a perspective view showing that the tension member is fixed to an upper fixing portion, which corresponds to FIG. 5.
Figure 9:
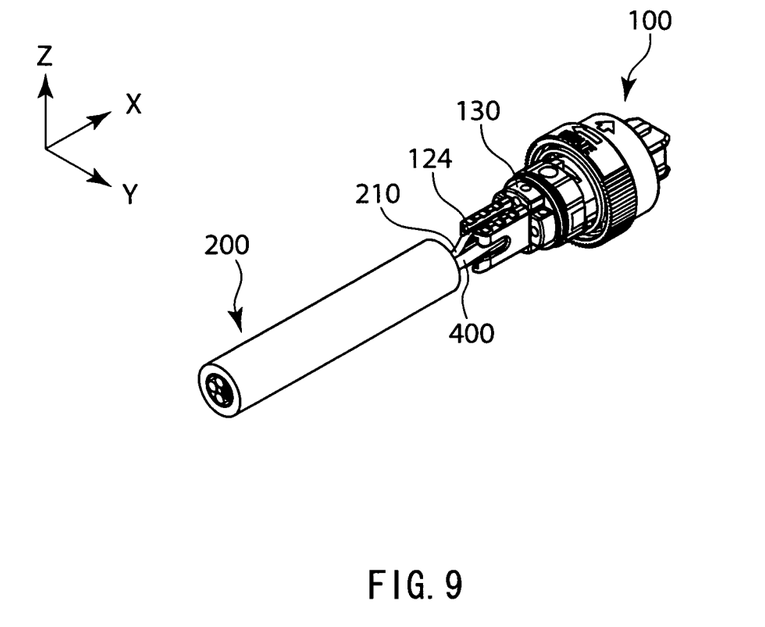
FIG. 9 is a perspective view showing that the tension member is fixed to a leftward fixing portion, which corresponds to FIG. 5.
Figure 10:
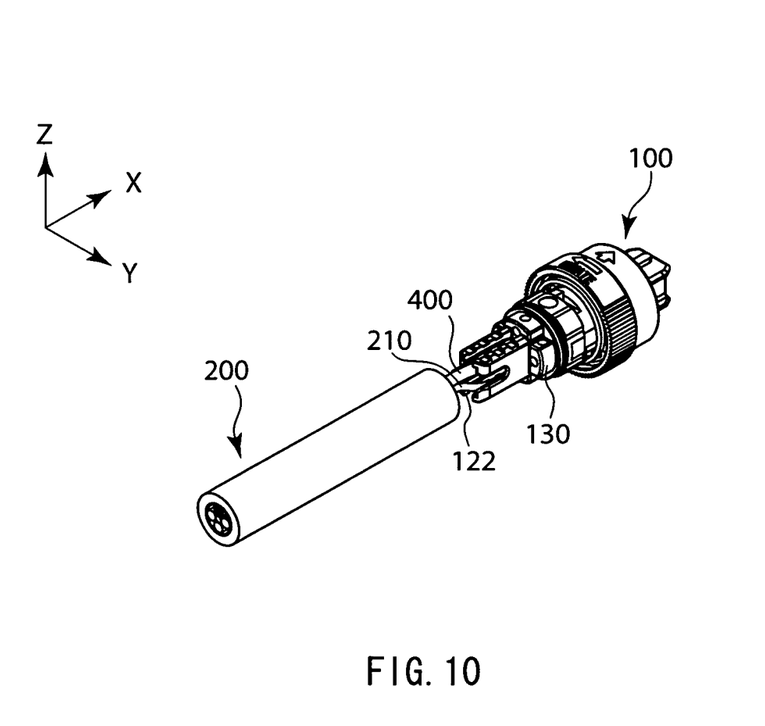
FIG. 10 is a perspective view showing that the tension member is fixed to a lower fixing portion, which corresponds to FIG. 5.

The first type optical fiber cable 200 is attached to the optical connector 100 having the above structure as shown in FIGS. 4 to 7. First, as can be seen from FIGS. 4 and 5, a holder ring 510 is attached around the optical connector 100 at the middle of the optical connector 100 in the X-direction. The common ferrule 410 of the first type optical fiber cable 200 is inserted and received from the rear end of the swage portion 120 into the receptacle portion 110 of the optical connector 100. At the same time, the end of the tension member 210 is inserted into the receiver hole 132 of the fixing portion 130. Furthermore, the end of the tension member 210 received in the receiver hole 132 is fixed by threading a screw into the screw hole 134. In the illustrated example, the tension member 210 passes through the rightward relief groove 124 as viewed from the rear end of the optical connector 100. The end of the tension member 210 is received in the rightward receiver hole 132. Then, as shown in FIG. 6, an enclosure 520 is moved toward the optical connector 100 on an outside surface of the first type optical fiber cable 200 and is connected to the holder ring 510. Thus, the optical connector cable as shown in FIG. 7 can be obtained. In this example, the tension member 210 is fixed to the rightward fixing portion 130. However, the tension member 210 may be fixed to other fixing portions 130 depending upon the eccentric direction of the common optical fiber 400. For example, as shown in FIG. 8, the tension member 210 may be fixed to the upper fixing portion 130. Alternatively, the tension member 210 may be fixed to the leftward fixing portion 130 as shown in FIG. 9 or to the lower fixing portion 130 as shown in FIG. 10. Thus, adjustment and maintenance of the eccentric direction and fixing of the tension member 210 can simultaneously be achieved without unnecessary twisting forces applied to the common optical fiber 400. Furthermore, as shown in FIGS. 6 and 8 to 10, since the tension member 210 passes through the relief groove 122 or 124 corresponding to the fixing portion 130 (i.e. corresponding to the receiver hole 132), it is not necessary to forcibly fix the tension member 210 to the fixing portion 130 even though the swage portion 120 is provided.

Figure 12:
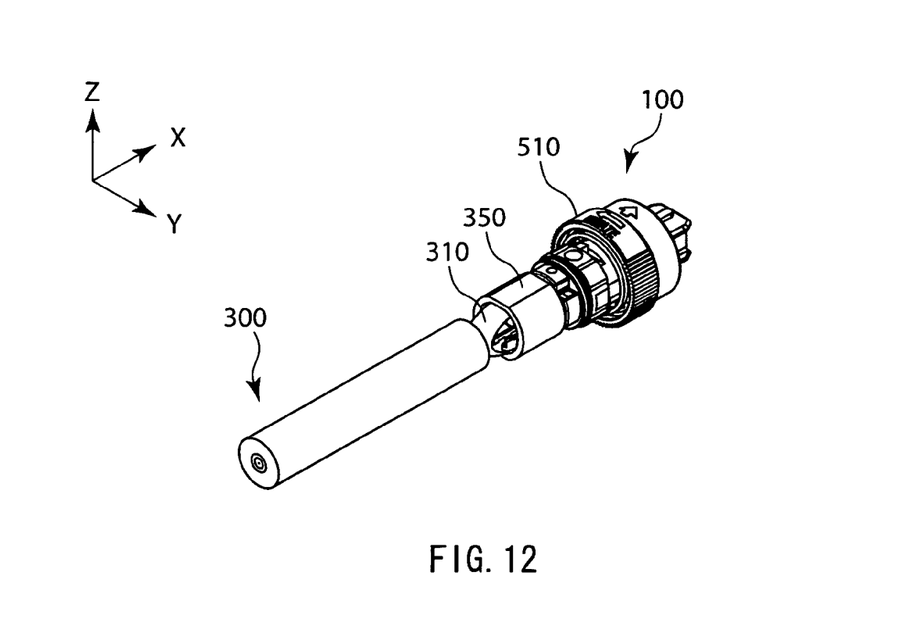
FIG. 12 is a perspective view showing an attachment step subsequent to FIG. 11.
Figure 13:
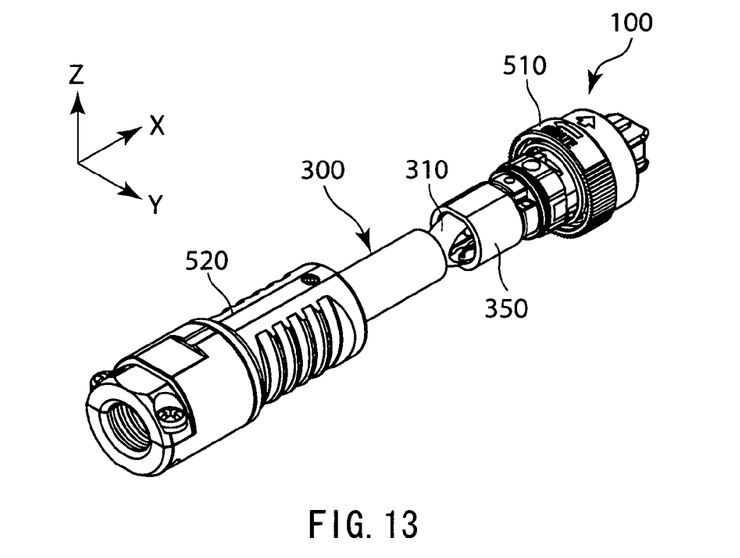
FIG. 13 is a perspective view showing an attachment step subsequent to FIG. 12.

Furthermore, as shown in FIGS. 11 to 13, the optical connector 100 thus arranged can be attached to the second type optical fiber cable 300. As can be seen from FIGS. 11 and 12, the common ferrule 410 of the second type optical fiber cable 300 is inserted into the receptacle portion 110 of the optical connector 100 attached with the holder ring 510. The tensile member 310 is positioned on the irregularities 126 of the swage portion 120 (i.e. on the outer surface 121 of the swage portion 120). A swaging ring 350 is moved frontward so that the tensile member 310 is swaged by the use of an upper portion and a lower portion of the swaging ring 350 in a state where the tensile member 310 is located between the irregularities 126 and the swaging ring 350. Thus, the tensile member 310 on the outer surface 121 is swaged to the swage portion 120 when the second type optical fiber cable 300 is attached to the optical connector 100. At that time, the swaging ring 350 can be positioned by bringing an end of the swaging ring 350 into contact with end surfaces of the fixing portions 130. Then, as shown in FIG. 13, the enclosure 520 is moved toward the optical connector 100 on an outside surface of the second type optical fiber cable 300 and is connected to the holder ring 510. Thus, the optical connector cable as shown in FIG. 7 can be obtained. As described above, the optical connector 100 of this embodiment can be attached to the first type optical fiber cable 200 having the tension member 210 and also to the second type optical fiber cable 300 having the tensile member 310.

Figure 14:
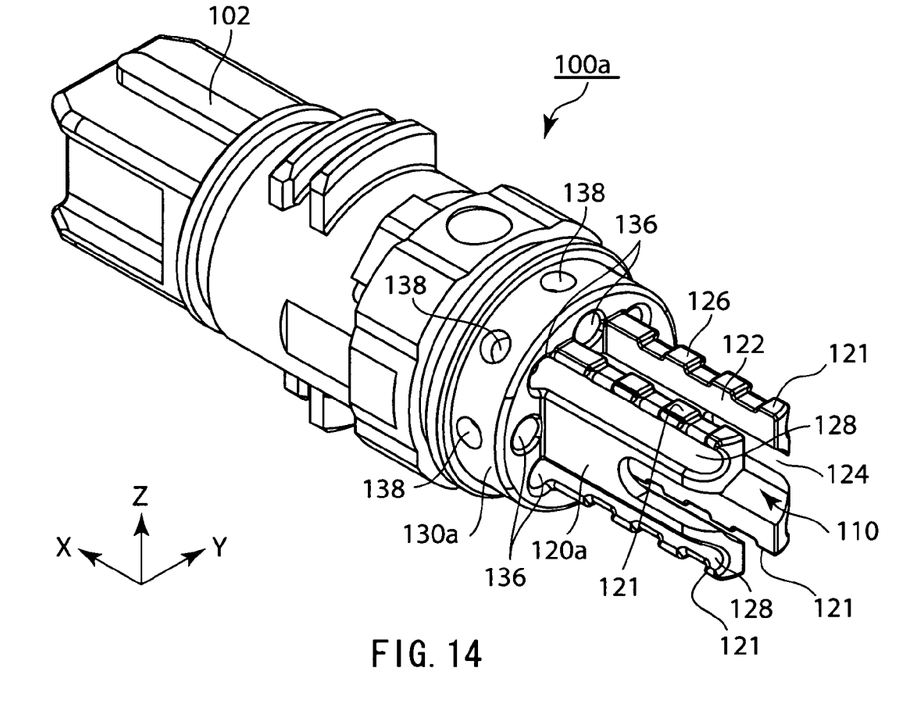
FIG. 14 is a perspective view showing an optical connector according to a second embodiment of the present invention.
Figure 15:
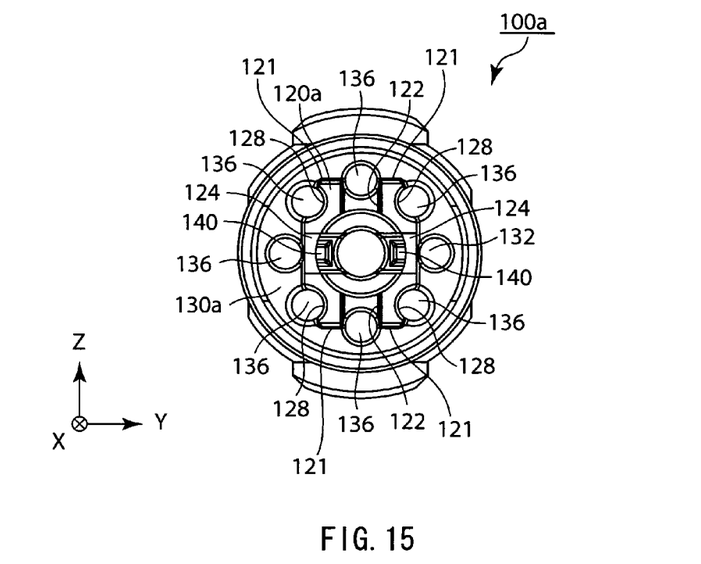
FIG. 15 is a rear view showing the optical connector of FIG. 14.

As shown in FIGS. 14 and 15, an optical connector 100a according to a second embodiment of the present invention is a variation of the optical connector 100 of the first embodiment. The optical connector 100a has the same structure as the optical connector 100 of the first embodiment except for a swage portion 120a and a fixing portion 130a. Therefore, the following description is focused on the differences between the optical connector 100a of the second embodiment and the optical connector 100 of the first embodiment.

Referring to FIGS. 14 and 15, the fixing portion 130a of the optical connector 100a according to the present embodiment has eight receiver holes 136 and eight screw holes 138. The swage portion 120a has guide grooves 128 in addition to relief grooves 122 and 124.

Specifically, the receiver holes 136 are formed at angular intervals of 45 degrees around the axis as viewed from a rear side of the optical connector 100a. Each of the receiver holes 136 extends in the longitudinal direction (the X-direction). In contrast, each of the screw holes 138 extends in a radial direction perpendicular to the optical axis as viewed from the rear side of the optical connector 100a. Each of the screw holes 138 extends from an exterior of the fixing portion 130a in a direction perpendicular to the optical axis and communicates with the receiver hole 136, respectively, as with the first embodiment.

The guide grooves 128 correspond to the receiver holes 136 which are located around the optical axis at angular intervals of 45 degrees from an upper position, a rightward position, a lower position, and a leftward position. The guide grooves 128 are formed in the swage portion 120a so as to extend along the longitudinal direction.

In the optical connector 100a of this embodiment, the screw holes 138 extend in radial directions. Therefore, an end of the tension member can be fixed by a screw by rotating the optical connector 100a around the optical axis. Accordingly, good workability can be obtained with the optical connector 100a of this embodiment.

Figure 16:
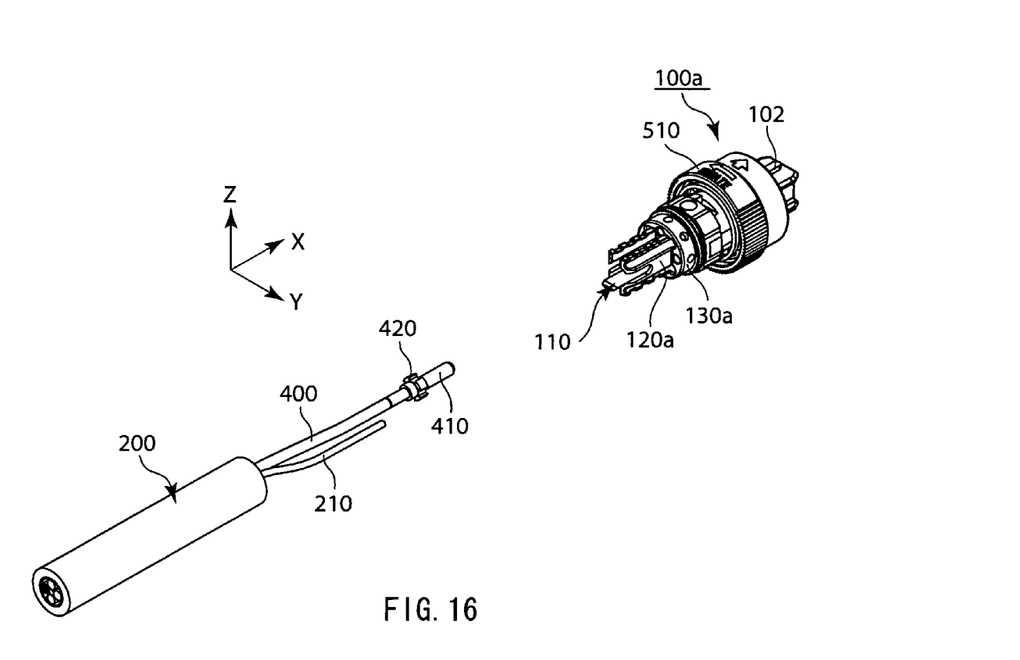
FIG. 16 is a perspective view showing a step of attaching a first type optical fiber cable having a tension member to the optical connector of FIG. 14.
Figure 17:
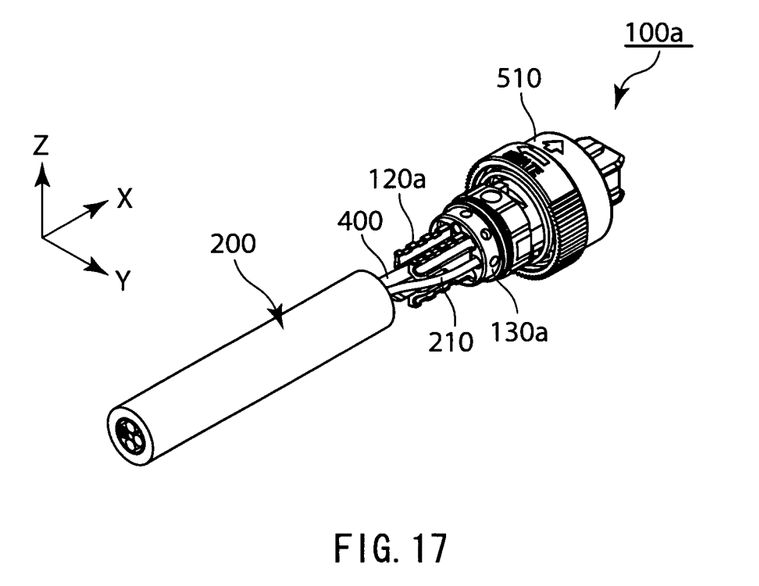
FIG. 17 is a perspective view showing an attachment step subsequent to FIG. 16. The tension member is fixed to a right side of a fixing portion of the optical connector.
Figure 18:
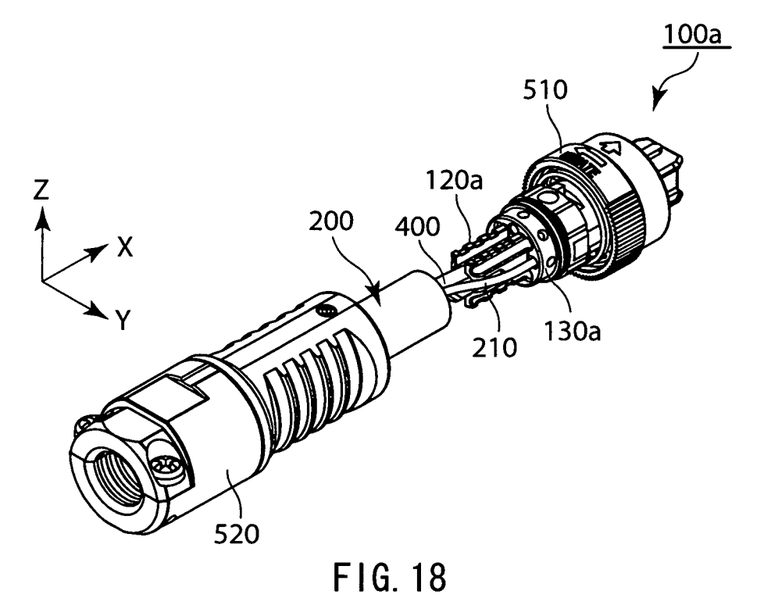
FIG. 18 is a perspective view showing an attachment step subsequent to FIG. 17.

The first type optical fiber cable 200 is attached to the optical connector 100a having the above structure as shown in FIGS. 16 to 18. First, as can be seen from FIGS. 16 and 17, the common ferrule 410 of the first type optical fiber cable 200 is inserted and received from the rear end of the swage portion 120a into the receptacle portion 110 of the optical connector 100a to which the holder ring 510 is attached. At the same time, the end of the tension member 210 is inserted into the receiver hole 136 of the fixing portion 130a. Furthermore, the end of the tension member 210 received in the receiver hole 136 is fixed by threading a screw into the screw hole 138. In the illustrated example, the end of the tension member 210 is received in and fixed to the rightward receiver hole 136. However, the end of the tension member 210 may be received in and fixed to other receiver holes 136 depending upon the eccentric direction of the common optical fiber 400. In other words, the receiver holes 136 are selectable in accordance with possible engagement relationships between the rotation prevention keys 140 and the key grooves 420. Then, as shown in FIG. 18, an enclosure 520 is moved toward the optical connector 100a on an outside surface of the first type optical fiber cable 200 and is connected to the holder ring 510. Thus, the optical connector cable can be obtained (see FIG. 7). As with the optical connector 100 of the first embodiment, the optical connector 100a having the above structure can be attached to the second type optical fiber cable 300.

In the above embodiments, the swage portion and the fixing portion(s) are formed integrally with each other. Nevertheless, the swage portion and the fixing portion(s) may be produced separately and bonded to each other by press fitting or the like.

As described above, an optical connector according to the present invention can be attached to various types of optical fiber cables.

According to the present invention, a swage portion for swaging a tensile member and a fixing portion for fixing an end of a tension member are provided on a single optical connector. Therefore, the optical connector cable is selectively applicable to one of optical fiber cables including an optical fiber cable having a tensile member and an optical fiber cable having a tension member.

Additionally, the fixing portion is provided closer to a front end of the optical connector (i.e., closer to a mating surface between the optical connector and a mating connector) than the swage portion. In other words, the fixing portion is located forward of the swage portion. Therefore, the workability of attachment of the optical fiber cable to the optical connector can be improved. Moreover, even if the optical fiber cable is unintentionally bent in a state where the optical fiber cable is attached to the optical connector, adverse influence on the optical fiber of the optical fiber cable can be reduced.

The present application is based on a Japanese patent application of JP2009-228368 filed before the Japan Patent Office on Sep. 30, 2009, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An optical connector selectively attachable to one of optical fiber cables including a first type optical fiber cable and a second type optical fiber cable, each of the optical fiber cables including a common optical fiber and a common ferrule fixed to the common optical fiber, the first type optical fiber cable further including a tension member, the second type optical fiber cable further including a tensile member, the optical connector comprising:

a swage portion through which the common ferrule is inserted forward when one of the optical fiber cables is attached to the optical connector, the swage portion having an outer surface on which the tensile member is swaged when the second type optical fiber cable is attached to the optical connector; and a fixing portion having at least one receiver hole which receives and fixes an end of the tension member when the first type optical fiber cable is attached to the optical connector, the fixing portion being located forward of the swage portion.

2. The optical connector according to claim 1, wherein:

the swage portion is formed with at least one relief groove which corresponds to the at least one receiver hole; and a pair of the relief groove and the receiver hole are located on a single radius extending from an optical axis of the optical fiber cable as viewed from a rear end of the swage portion.

3. The optical connector according to claim 2, wherein:

the optical fiber cable is provided with a plurality of key grooves which is used to adjust an eccentric direction of the optical fiber when the optical fiber cable is attached to the optical connector;

the optical connector has at least one rotation prevention key designed to be engagable with at least one of the plurality of key grooves;

the optical connector has a plurality of the receiver holes selectable in accordance with possible engagement relationships between the at least one rotation prevention key and the plurality of key grooves; and the swage portion has a plurality of the relief grooves corresponding to the plurality of the receiver holes.

4. The optical connector according to claim 3, wherein:
the number of the plurality of key grooves is four;
the number of the at least one rotation prevention key is two; and
the two rotation prevention keys are opposed to each other in a lateral direction of the optical connector.

5. The optical connector according to claim 4, wherein the plurality of the relief grooves includes two relief grooves opposed to each other in a vertical direction so as to extend over the swage portion along the optical axis and two relief grooves opposed to each other in the lateral direction.

6. The optical connector according to claim 1, wherein:
the at least one receiver hole extends along an optical axis of the optical fiber cable;
the fixing portion has at least one screw hole extending from an exterior of the fixing portion in a direction perpendicular to an optical axis of the optical fiber cable, the at least one screw hole communicating with the at least one receiver hole; and
a screw is threaded into the at least one screw hole to fix the end of the tension member within the at least one receiver hole when the end of the tension member is received in the at least one receiver hole.

7. The optical connector according to claim 6, wherein:
the fixing portion has a plurality of receiver holes and a plurality of screw holes, each of the receiver holes being paired with a respective screw hole; and
the screw holes extend in parallel to each other.

8. The optical connector according to claim 6, wherein:
the fixing portion has a plurality of receiver holes and a plurality of screw holes, each of the receiver holes being paired with a respective screw hole; and
each of the screw holes extends in a radial direction perpendicular to an optical axis of the optical fiber cable.

9. The optical connector according to claim 1, wherein the swage portion has a rectangular shape having lateral sides and vertical sides longer than the lateral sides as viewed from a rear end of the swage portion.

10. The optical connector according to claim 9, wherein the swage portion has irregularities formed on an upper surface and a lower surface thereof.

11. The optical connector according to claim 1, wherein the swage portion and the fixing portion are formed integrally with each other.

12. An optical connector cable comprising:
one of optical fiber cables including a first type optical fiber cable and a second type optical fiber cable, each of the optical fiber cables including a common optical fiber and a common ferrule fixed to the common optical fiber, the first type optical fiber cable further including a tension member, the second type-optical fiber cable further including a tensile member; and
an optical connector attached to the one of the optical fiber cables, the optical connector including a fixing portion and a swage portion through which the common ferrule is inserted forward when one of the optical fiber cables is attached to the optical connector, wherein:
the swage portion has an outer surface on which the tensile member is swaged when the second type optical fiber cable is attached to the optical connector; and
the fixing portion has at least one receiver hole which receives and fixes an end of the tension member when the first type optical fiber cable is attached to the optical connector, the fixing portion being located forward of the swage portion.

* * * * *